United States Patent
Erekson et al.

(10) Patent No.: US 6,826,174 B1
(45) Date of Patent: Nov. 30, 2004

(54) VOICE-OVER-IP INTERFACE FOR STANDARD HOUSEHOLD TELEPHONE

(75) Inventors: Rich Erekson, Roy, UT (US); Timothy W. Aldridge, Sandy, UT (US); Tim Urry Price, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/516,857

(22) Filed: Mar. 2, 2000

(51) Int. Cl.[7] .......................... H04L 12/66; H04L 12/56
(52) U.S. Cl. ........................................ 370/352; 370/401
(58) Field of Search ................................. 370/353, 356, 370/354, 461, 462, 463, 252, 352, 400, 401

(56) References Cited

U.S. PATENT DOCUMENTS

| | | | | |
|---|---|---|---|---|
| 5,604,737 A | * | 2/1997 | Iwami et al. ............... | 370/352 |
| 5,742,596 A | * | 4/1998 | Baratz et al. ............... | 370/356 |
| 5,892,764 A | * | 4/1999 | Riemann et al. ............ | 370/401 |
| 5,940,479 A | * | 8/1999 | Guy et al. ................ | 379/93.01 |
| 5,974,043 A | * | 10/1999 | Solomon ..................... | 370/352 |
| 6,011,794 A | * | 1/2000 | Mordowitz et al. ......... | 370/389 |
| 6,125,127 A | * | 9/2000 | Smith, Jr. ................... | 370/524 |
| 6,144,670 A | * | 11/2000 | Sponaugle et al. ......... | 370/401 |
| 6,144,852 A | * | 11/2000 | Orosz ......................... | 455/423 |

* cited by examiner

*Primary Examiner*—Chau Nguyen
*Assistant Examiner*—Soon-Dong Hyun
(74) *Attorney, Agent, or Firm*—Workman Nydegger (57) ABSTRACT

The present invention enables a traditional analog telephone to be used with VoIP applications. For example, the user could connect their standard 900 MHz telephone to this invention, establish a VoIP call and enjoy the freedom of movement their cordless telephone provides. The preferred embodiment of the present invention minimizes overhead to the host computer via a dual CODEC modem that incorporates a DSP capable of simultaneous communication with the two CODEC modules. This architecture facilitates a latency and communication overhead reduction as the analog voice signals effectively "stream" from the first CODEC to the second CODEC.

18 Claims, 6 Drawing Sheets

VOICE-OVER-IP INTERFACE FOR STANDARD HOUSEHOLD TELEPHONE

BACKGROUND OF THE INVENTION

1. The Field of the Invention

This invention is in the field of Voice Over Internet Protocol (VoIP) communications and, more particularly, to a system and method of interfacing a standard telephone to a VoIP compatible communication network.

2. The Prior State of the Art

Voice Over Internet Protocol (VoIP) is an emerging technology that allows the systems and wires that connect computer networks to act as an alternative to phone lines, delivering real-time voice to both standard telephones and PCs. VoIP allows an individual to utilize their computer connection to transmit voice encapsulated data packets over available local communication lines, such as the Internet, to another user on another computer, thereby creating a long distance phone call at a local connection price.

How VoIP Works

In a Voice-over-IP (VoIP) system, the analog voice signal is typically picked up by a microphone and sent to an audio processor within a PC. There, either a software or hardware CODEC performs analog-to-digital conversion and compression. Considerable research has been devoted to voice compression schemes that are well know to those skilled in the art. The nominal bandwidth required for telephone-type voice ranges from 2.9 Kbps (RT24 by Voxware) to 13 Kbps (GSM cellular standard).

In placing the CODEC output into packets, there is a trade-off between bandwidth and latency. CODECs do not operate continuously. Instead, they sample the voice over a short period of time, known as a frame. These frames are like little bursts of data. One or more frames can be placed in a single IP datagram or packet, and then the packet payload is wrapped in the necessary packet headers and trailers. This packet overhead is at least 20 bytes for IP and 8 bytes for the User Datagram Protocol (UDP). Layer 2 protocols add even more overhead. Waiting longer to fill the IP datagram reduces overall overhead, which in turn reduces the true bandwidth needed to send the digitized voice. However, this waiting creates latency at the source, and too much total latency makes for a difficult conversation. Chart 1 shows the basic trade-off for initial latency versus true bandwidth.

CHART 1

Latency vs. Bandwidth Required for Voice-over-IP

The total network latency and jitter (changes in the latency) have a degrading effect upon voice quality. Therefore, real-time voice quality is difficult to maintain over a large wide-area packet network without priority handling. As previously mentioned, VoIP converts standard telephone voice signals into compressed data packets that can be sent locally over Ethernet or globally via an ISP's data networks rather than traditional phone lines. One of the main difficulties with VoIP connections is that the communication network supporting a VoIP platform must be able to recognize that VoIP data packets contain voice signals, and be "smart" enough to know that the communication network has to move the data packets quickly.

Presently, serious voice traffic does not use the public Internet but runs on private IP-based global networks that can deliver voice data with minimal congestion. As such, transmission of voice signals over private data networks offers businesses some great advantages. For ISPs, merging voice and data on one single network allows them to expand their services beyond simple information access and into the realm of voice, fax, and virtual private networking. For businesses, the benefit is big savings on long-distance service. The Internet right now is a free medium on many networks. If businesses can send voice over a computer network, businesses can conceivably make long-distance or international calls for the cost of a local call. VoIP further facilitates electronic commerce by allowing a customer service rep using one data line to answer telephone questions while simultaneously placing a customer's order online, perusing the company's web site, browsing an online information/product database, or sending an E-mail. Similarly, VoIP also creates new possibilities for remote workers, who for the cost of a local call can log in remotely, retrieve voice mail from their laptop PCs, and keep their E-mail and web applications running while conducting multiple voice and data calls over one phone line. Presently, this type of expanded VoIP functionality is exclusively limited to those with access to private IP based networks, such as business users and not the typical household user.

In fact, most household computer users are generally limited to the congested public Internet and cannot implement the VoIP standard effectively. If latency and jitter are too high, or the cost of reducing them is excessive, one alternative is to buffer the CODEC data at the receiver. A large buffer can be filled irregularly but emptied at a uniform rate. This permits good quality reproduction of voice. Such a buffering technique is known as audio streaming, and it is a very practical approach for recorded voice or audio. Unfortunately, excessive buffering of the audio signals leads to generally unacceptable one-sided telephone conversations, where one party dominates the transmissions. What is needed is a packetized telephone system that is able to compensate for latency and jitter, without introducing noticeable buffering.

Traditionally, the operating environment for a household user with a VoIP connection is either a laptop or desktop general-purpose computer. The recording and transmission or interpretation of the VoIP packets takes place in the sound system or modem DSP found on the laptop or desktop. As such, the desktop system has a minor advantage over the laptop, because the desktop sound system traditionally provides stereo surround speakers and an accurate microphone. Thus, the desktop system can more accurately capture an individual's voice for retransmission of these voice signals to the user on the other end of the connection. VoIP telephone software buffering and control structures help improve the connection, but even though the audio signal has been accurately sampled, the processor delays and transmission latency associated with the desktop VoIP connection over the public Internet tends to result in a barely audible VoIP call. What is needed is a household compatible packetized telephone system that is able to compensate for communication network delays and hardware limitations, without introducing noticeable degradation into the voice signal.

One of the main difficulties with using VoIP in a household system is that the protocol requires the user to follow numerous steps in order to establish a voice connection. In addition to the normal boot-up process associated with general-purpose computers for the operating system and the Internet telephone application, there are several details difficult for the household user to provide. For example, if a user were trying to contact another individual, they would need to know the individual's IP address and punch the address into their software application or web browser to contact the individual. Once the user contacts the individual through either E-mail or at the website, the user must notify them that the user wishes to initiate a VoIP connection. Then the individual being contacted would enable their VoIP to allow the user to begin streaming voice packets between the two devices. What is needed is a simple method of using VoIP with a household telephone, so that at the time the call is placed a user need only dial the access number on the telephone for the VoIP connection to be initiated and if possible connected.

In addition to the start-up delay and the awkward communication setup for most desktop systems, another problem with present VoIP systems is the immobility limitations imposed on the user by the VoIP desktop system. While the sound system is able to make an accurate recording, the user must sit at the desktop location or at least within range of the attached microphones and speakers to communicate. Unlike a telephone, the desktop system is very difficult to move to another room and it is generally considered very impractical to have multiple Internet capable workstations in one house due to the cost for each workstation. In effect, the user is "chained" to the one location and the problems associated with talking over the computer sound system whenever the user desires to make VoIP calls. What is needed is a simple method of integrating a typical cordless phone with a computer to obtain a short-range wireless VoIP connection with the look and feel of a standard household telephone system.

Being mobile by nature, laptop sound systems present a different problem. As these systems are generally a design afterthought, it is often challenging for the user to even turn on the microphone, let alone conduct a VoIP session. The laptop microphone is generally very small, inexpensive, and mounted inconspicuously on the laptop case making it difficult for the microphone to function at quality levels comparable to what users have come to expect from a telephone. Thus, one of the problems facing VoIP is that home users are used to talking on telephones and expect a certain quality of sound in communication between them and another user. What is needed is a method of integrating VoIP communication that also removes the limitations presently associated with computer-based speakerphones.

SUMMARY OF THE INVENTION

Accordingly, one advantage of the invention is to create the same look, feel, and usage to which the user is accustomed from the standard telephone connection.

Another advantage of the invention is to provide a method and system that facilitates short-range wireless telephone functionality between a handset and a base station, while maintaining VoIP communication between a dialed party and a host computer attached to the short-range wireless base station.

A further advantage of the invention is to provide a packetized telephone system that is able to compensate for latency and jitter, without introducing noticeable buffering delays.

It is another advantage of the present invention to provide a system that integrates a cordless telephone with a host computer system to thereby release the requirement that the user placing a VoIP call be in the near vicinity of the connection origin.

Yet another advantage of the invention is transmission of various digitally reproduced audio signals to the telephone headset indicating the status of the VoIP telephone application, wherein the audio signals closely resemble the error and status signals present on the standard telephone system.

The above and other advantages of the invention are satisfied at least in part by providing interface circuitry and software on or between a short-range wireless telephone and a host computer. The interface analyzes and converts analog voice signals from the telephone handset microphone into digital packets for transmission according to a VoIP protocol across an attached communication network. Received digital packets are converted by the interface into an analog signal for transmission by the telephone handset speaker. The circuitry comprises a podule and a dual CODEC modem. The podule is capable of generating voltage for ring signals, dial tones, busy signals, and error codes to the headset according to inputs from the attached modem DSP. The podule also converts the two-wire telephone connection into a four-wire connection and imitates the isolation barrier responses of POTS. The dual CODEC modem is capable of converting voice and data transmissions through the first CODEC pipeline and transceiving encapsulated data packets received or sent via the attached communication network through the second CODEC pipeline. The modem DSP is capable of simultaneously maintaining sessions with both CODECs. The software and modem DSP work in conjunction to generate various logical control signals for the VoIP interface and control communication across the interface circuitry. The software and circuitry interface being able to generate a ring signal in the attached telephone handset after detecting an incoming VoIP call. The interface also generating error tones and dial tones when the software application is running and the handset is off-hook.

In addition to the improved architectutre of the dual CODEC modem, the present invention also benefits from the improved network connections available to the household user, such as G-lite DSL, aDSL, or xDSL network connections. While a user can use a standard telephone, plug it into the present invention, and make VoIP calls, through the standard PSTN or POTS connection, the more preferred network connection is a sub-rate DSL connection. A G-lite DSL connection is a sub-rate of a Digital Subscriber Link (DSL). If a full rate DSL connection has a 10 Megabyte bandwidth, a G-lite DSL user could order a portion of that bandwidth and be able to avoid the cost of the full bandwidth. For the average user, a 1.5 Megabyte bandwidth would be sufficient to transmit and receive voice packets at a rate at which the user would not notice a difference in sound between a telephone connection and an Internet connection. In essence, the G-lite DSL connection enables a user to use a sub-rated DSL to obtain the VoIP performance necessary for a comparison phone line connection. In this manner, the present invention facilitates household users of VoIP talking from PC-to-PC, phone-to-phone, or even PC-to-phone.

The present invention allows a VoIP household user to pick up an attached telephone and dial the appropriate DTMF digits, which are intercepted by the modem. The modem references the detected digits in a database or look-up file containing pre-set values that correlate the dialed number to an IP address. If a value is discovered the present invention will attempt to initiate the VoIP connection. In essence, this process enables a user to selectively establish a telephone communication method utilizing the most inexpensive method of connection. For example if a VoIP connection is available for a long distance call, the phone interface will automatically select and contact that type of connection. But if a standard connection is required, then the phone will utilize attached PSTN lines to establish a standard phone connection.

As previously mentioned, a significant advantage of this invention is the enhanced utilization of a processor which has two separate CODEC modules on board allowing a user to run two CODEC sessions. For example, one device has a CODEC for a cell phone and another for an analog line or PSTN connection. This processor can easily be modified such that an individual may use one CODEC for data through the telephone and communicate back and forth to the telephone using that CODEC, while the other CODEC is utilized with either a G-lite connection or across the standard PSTN phone line. While this particular invention would work over the modem protocol standard V.90, the preferred embodiment utilizes G.lite.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The invention is described below using diagrams to illustrate either the structure or the processing of embodiments used to implement the systems and methods of the present invention. Using the diagrams in this manner to present the invention should not be construed as limiting of its scope. The present invention contemplates both methods and systems for Voice-over-Internet-Protocol interfacing and communication between a standard household short-range wireless telephone (e.g. a 900 MHz, Bluetooth, 802.11 RF interface or other wireless interface) and a PC. The embodiments of the present invention may comprise a special purpose or general-purpose computer including various computer hardware configurations, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
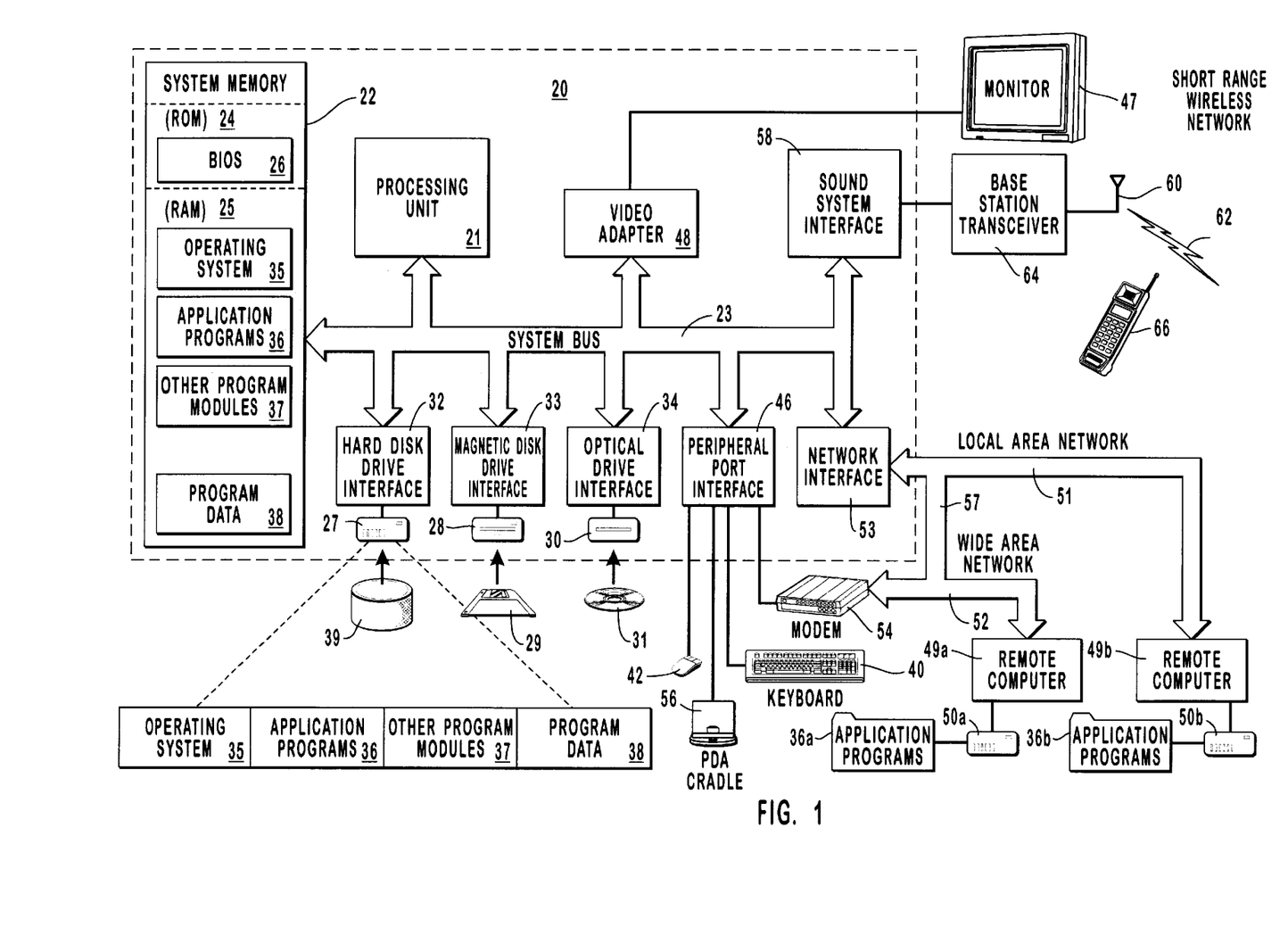
FIG. 1 illustrates an exemplary system that provides a suitable operating environment for the present invention.

FIG. 1 and the following discussion are intended to provide a brief, general description of a suitable computing environment in which the invention may be implemented. The invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, Personal Digital Assistants, and the like. The invention may also be practiced in distributed computing environments where local and remote processing devices perform tasks that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general-purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, magnetic tapes, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, PDA cradle 56, or other input devices (not shown), such as a microphone, joy stick, game pad, digital camera, satellite dish, scanner, or the like. These and other input devices are often connected to the processing unit 21 through a serial port interface 46 coupled to system bus 23. Alternatively, the input devices may be connected by other interfaces, such as a parallel port, a serial port, an infra-red port, a short-range wireless port, an RF port, or a game port or a universal serial bus (USB). A short range wireless telephone handset 66 or another short-range wireless (e.g. 900 MHz, Bluetooth, 802.11 RF or other wireless interface) enabled device is connected to the system bus 23 via antenna 60 attached to short-range wireless base station transceiver 64 that is connected to sound system interface 58. Alternatively, the short-range wireless base station 64 may be connected to computer 20 via other interfaces, such as a modem interface, a podule interface, peripheral port interface 46, or other telephone compatible interface capable of receiving and converting audio signals into data packets and for converting and transmitting digital packets into audio signals. A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a PDA, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51, a local short-range wireless network 62, and a wide area network (WAN) 52 that are presented here by way of example and not limitation. Multiple area network 57 is a logical connection or bridge between the LAN and WAN resources accessible via network interface 53 or modem 54. Such networking environments are or will be commonplace in office-wide or enterprise-wide computer networks, intranets and the Internet.

When used in a LAN networking environment, the computer 20 is connected to the local area network 51 through a network interface or adapter 53. When used in a WAN networking environment, the computer 20 may include a modem 54, a wireless link, or other means for establishing communications over the wide area network 52, such as the Internet or private IP based network. The modem 54, which may be internal or external, is connected to the system bus 23 via the peripheral port interface 46. The short-range wireless base station transceiver 64 typically exhibits a range dependent on the primary transmission protocol. For example, a device using the Bluetooth protocol typically exhibits a range of approximately 10 to 30 meters, but it is anticipated that this range may expand to over 30 meters. Other protocols exhibit larger operational ranges for example a 900 MHz phone may operate at distances over one mile away. A short-range wireless protocol, such as the Bluetooth protocol may also dictate that the number of remote short-range wireless devices in communication with short-range wireless base station transceiver 64 via antenna 60 at any one time, be limited to eight devices, however; timeslicing and other software semaphore methods could expand the number of devices attached to the eight short-range wireless connections. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
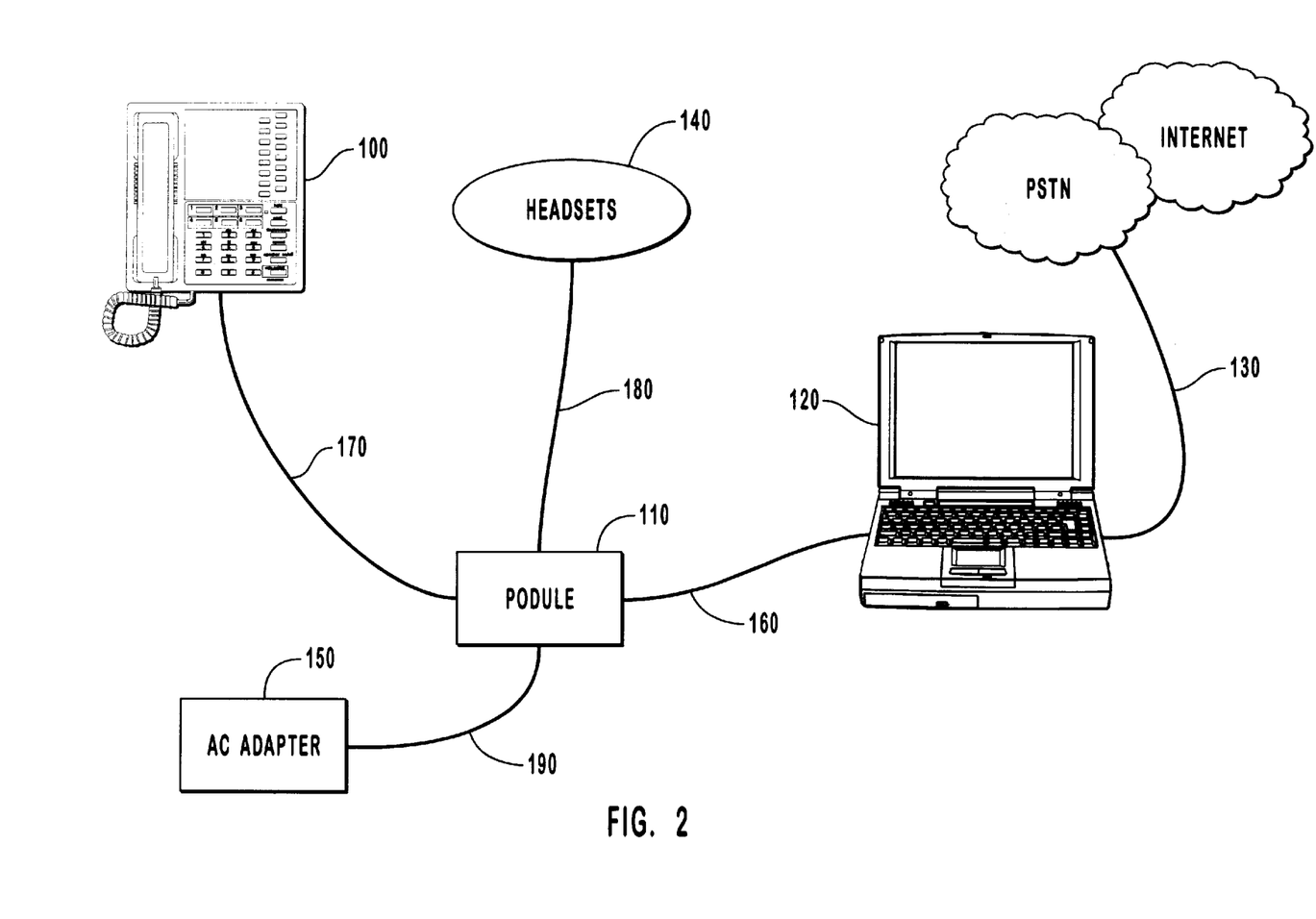
FIG. 2 illustrates another exemplary system that provides a podule interface connector between a household telephone and a laptop computer.

With reference to FIG. 2, an exemplary system illustrating the podule interface circuitry between an analog or standard telephone, and a computer and communication environment necessary to simulate a central office that allows VoIP via a typical telephone device. The telephone device may be a cordless phone, fax machine, modem, etc. Although other circuit implementations can be used, for example, a subscriber loop interface or a basic ASIC, this figure illustrates the necessary functionality to accomplish the communication.

The apparatus consists of a podule, which, on one end, allows a standard RJ11 cable to be connected to a standard telephone base station. The podule would be powered by an AC adaptor power supply 150. The other end of podule 110 would connect via line 160 through the 15 pin connector on a modem PC card to the laptop 120. The podule performs the following: 1) Provides sufficient voltage and current to charge the telephone's hold circuit, 2) Capable of supplying sufficient voltage upon initiation by a control string for off-hook and ring conditions, 3) Provides a 2–4 wire conversion between the podule 110 an modem of laptop 120, 4) Provides coupling circuitry allowing the desired signal to be passed through the podule (both RX/TX) while providing the electrical isolation required.

The laptop 120 has two CODECs and a DSP capable of running both CODECs simultaneously. The DSP uses one of the CODECs to maintain a connection to the external communication network, such as an Internet connection via a PSTN connection. The other CODEC is used to interface to the standard household telephone. While the preferred method is to use a dual CODEC modem with a DSP capable of handling both CODECs simultaneously, other methods include systems with two modems, a modem and a sound card, a network interface card and a modem or sound card, or any other dual CODEC system wherein once CODEC is dedicated to the telephone communication and the other facilitates network communication. The preferred method is particularly favorable as this configuration keeps voice traffic off of the system bus of the laptop and the DSP services the VoIP phone call. Once the modem and the PC have established the VoIP link, the podule provides an interface to the 900 MHz telephone or headset or the like.

The user could then enjoy the quality of their own telephone instead of the laptop sound system and poor LP speaker phone presently available.

A user may also use this invention to seamlessly correlate DTMF digits to IP addresses used for VoIP. For example, when the users take their household phone off-hook and dials the appropriate phone number, the modem would detect the DTMF digits and input them into the host PC software application that would correlate the numbers dialed to either a local number or an IP address, and make the VoIP connection. This correlation may be accomplished through an IP database or look-up table previously established by the user or downloaded as part of a VoIP phone book database.

An alternative embodiment utilizes podule 110 with an interface port that allows the user to plug in headset 140 via line 180 and interface with the laptop 120 and network connection 130. In this case, the previously described podule 110 could be used or simpler podule could be constructed which would not require AC adaptor 150 necessary for ring generation.

Figure 3:
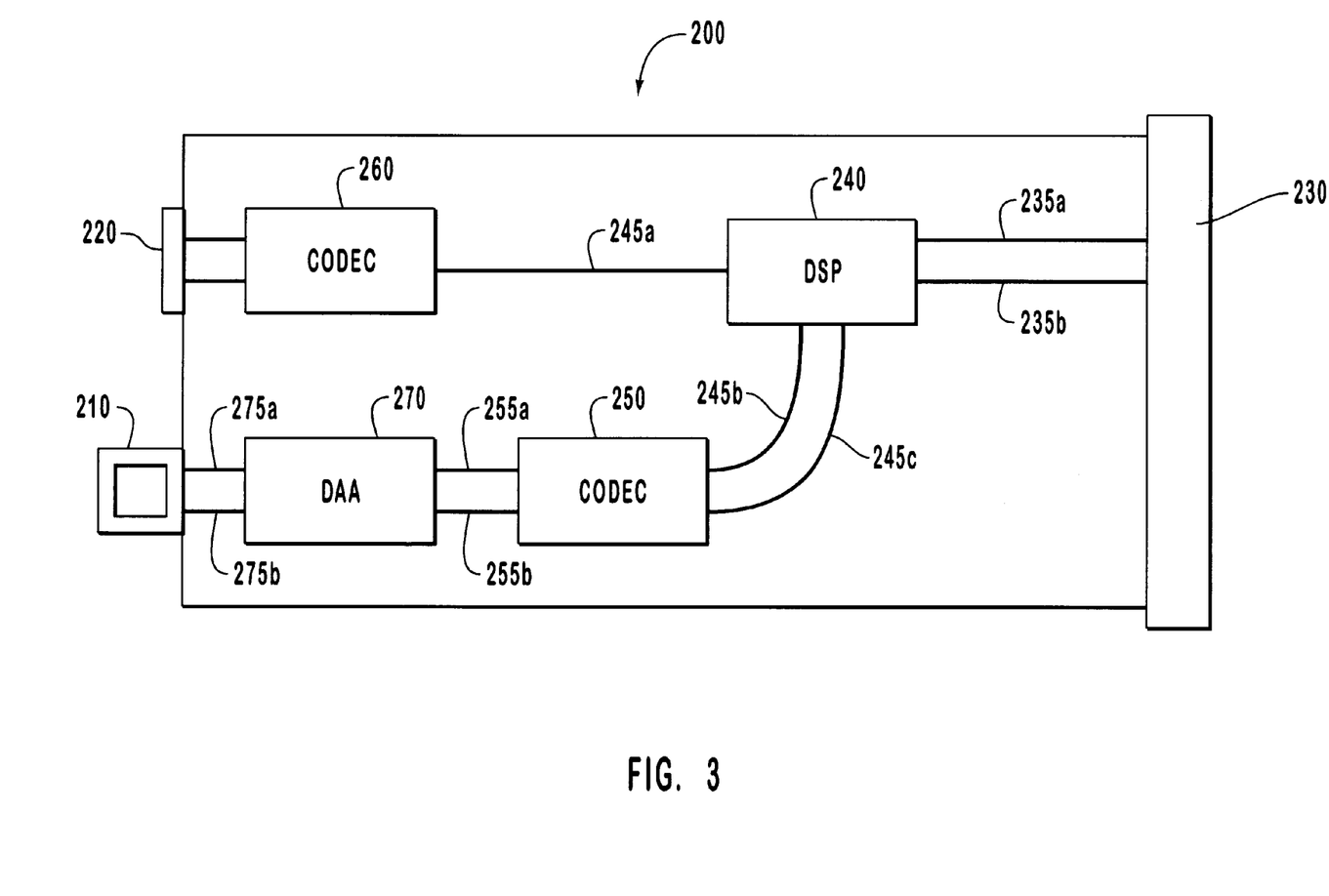
FIG. 3 is a block diagram of a suitable dual CODEC modem useful for the present invention.

With reference to FIG. 3, a modem 200 illustrates the preferred embodiment with the necessary double CODEC configuration providing a 15 pin interface 220 to a podule, a POTS connector 210 for connecting the PSTN line, and a PCMIA interface 230 for connecting the modem 200 to the host PC. DSP 240 is preferably a TI C54 DSP core, or an equivalent DSP that can simultaneously take and manage CODEC 250 and CODEC 260. Codec 250 and CODEC 260 perform analog to digital and digital to analog translation and interface with DSP 240 via communication bus lines 245$a$, 245$b$, and 245$c$. The DAA 270 is necessary for connection with the PSTN.

Supporting both the International Telecommunications Union (ITU) standard T.120 and H.323 protocol stacks, new VoIP systems should be geared toward standards-based, interactive, multimedia communications. Leveraging the flexibility of DSP technology, the VoIP system may implement standard G.711, G.723.1 and G.729 voice coding and decoding for ensured compatibility with standard global phone systems. The universal design of the access system provides the ability to process voice, fax and multimedia in a single system. The integration of additional applications and technologies in the platform can save an organization from having to deploy additional networking equipment.

The CODEC standard adopted for the H.323 family of standards is G.723 operating at 6.3 Kbps. But the effective bandwidth needed to operate G.723 with IP overhead and reasonable source latency is 10 to 15 Kbps. The total network latency and jitter (changes in the latency) have a degrading effect upon voice quality. Therefore, real-time voice quality is difficult to maintain over a large wide-area packet network with out priority handling. As mentioned, a bandwidth of 1.5 megabits is more than sufficient, but a PSTN connection must maintain 10 to 15 Kbps.

In the simplest embodiment, this invention contains three components: the host application, the modem functionality, and the functionality of the podule. A standard telephone expects the presence of a tip and ring interface such as a central office (CO). The telephone expects certain line characteristics, such as a 40 Volt potential between the tip and ring when a user takes the phone handset off-hook. The hold circuit in the standard telephone will draw between about 15 to 30 mA, more preferably 20 mA, of current from the tip and ring lines. This current draw, in effect, signals the CO that the phone is off-hook. The current also provides power to the standard telephone DAA allowing a user to transmit the signal across the isolation barrier into the telephone. As such, this all must be recreated within the podule for the telephone to function appropriately, meaning that the podule essentially becomes a mini-central office.

Figure 4:
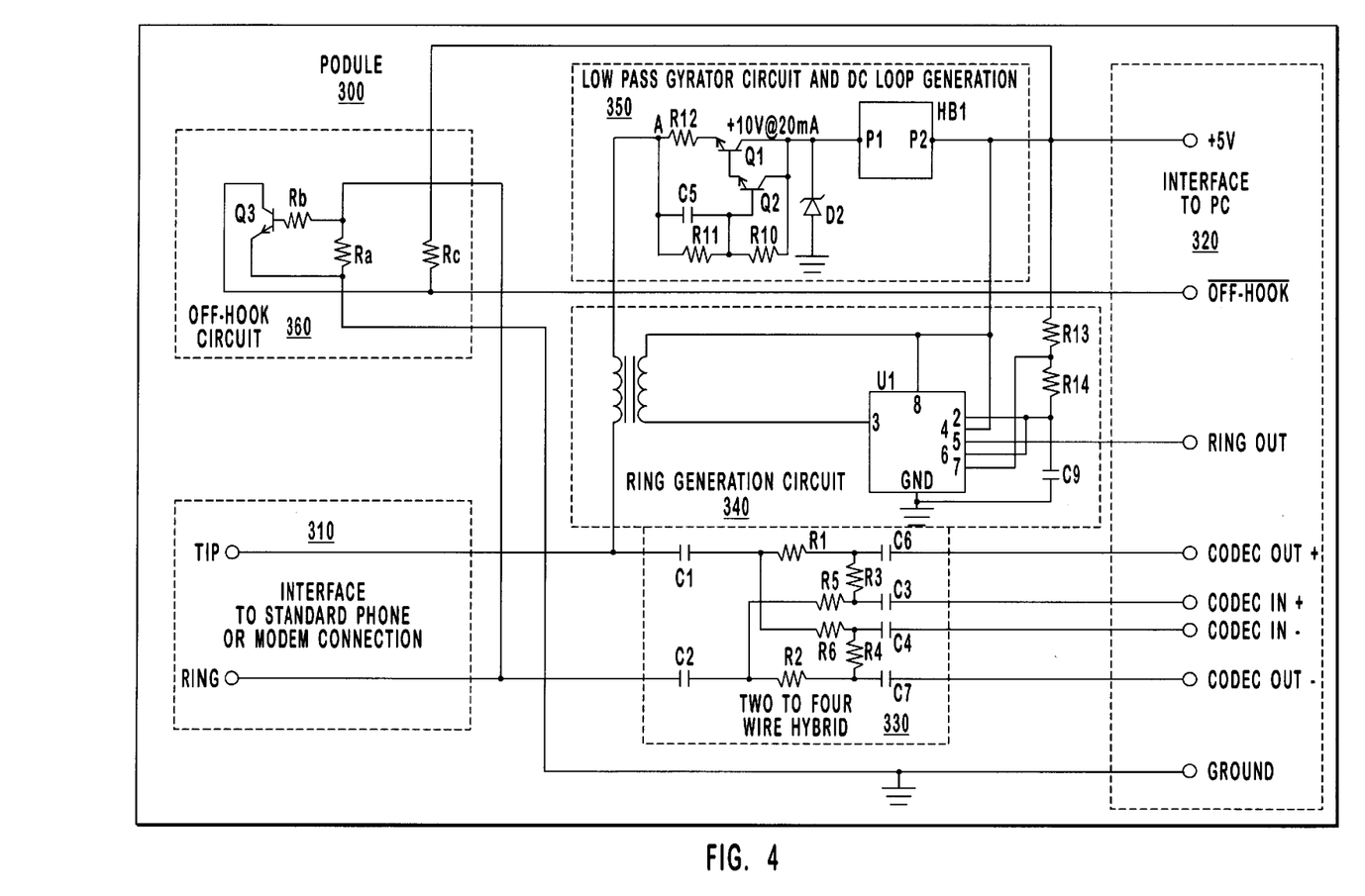
FIG. 4 is a schematic illustration of a podule interface for use with the present invention.

FIG. 4 specifically illustrates one embodiment that satisfies the emulation of the CO.

With reference now to FIG. 4, a schematic drawing of podule interface 300 comprising an interface to standard phone or modem connection 310, an interface to a personal computer 320, a two to four wire conversion module 330, a ring generation circuit 340, a low pass gyrator and DC loop generation module 350, and an off-hook circuit 360.

The standard phone or modem interface 310 generally has line connectors to receive the tip and ring lines attached to the phone. After phone interface 310, the two to four wire conversion module 330 splits off the tip and ring into a four-wire connection that eventually goes into the PC interface 320. FIG. 4 specifically illustrates an analog modem connection rather than a digital connection. The PC interface 320 is preferably a 15-pin GPIO connector for interfacing with a DSP, modem card, or PC. The four analog signal lines, Codec OUT+, Codec IN+, Codec OUT−, and Codec IN−, are fed into a hardware or software CODEC via the PC interface 320. These four analog signal lines are generally a differential input and output coming into the CODEC. The CODEC performs the analog to digital and digital to analog conversions of the voice signals and the packetized data that are sent out to the phone or the attached modem. The low pass gyrator circuit and DC loop generation module 350 supplies power to the standard telephone DAA and functions in a manner similar to a modem hold circuit. The loop generation module 350 also generates the required loop current needed to generate 20 mA from a 5-volt source for the hold circuit. Thus, the podule 300 supplies signal isolation, provides power, and completes a two wire to four-wire conversion.

The two to four wire conversion module 330 comprises R1, R2, C1, and C2 that are partially defined by the required AC termination impedance for the standard telephone equipment connected at telephone interface 310. R5, R3, R6, and R4 cancel the transmit signal noise by using phase relationships of the opposing transmit signal to cancel the transmit noise from the received input signal. C6, C3, C4, and C7 are DC blocking capacitors to void any DC offset to or from the CODEC. Exemplary enabling values for the individual components of the two to four wire conversion module 330 are provided in table 1 below:

TABLE 1

| FIG. 4 Components | |
|---|---|
| Component Designation | Value |
| C1 | 10 $\mu$F |
| C2 | 10 $\mu$F |
| R1 | 300 $\Omega$ |
| R2 | 300 $\Omega$ |
| R3 | 20 k$\Omega$ |
| R4 | 20 k$\Omega$ |
| R5 | 9.96 k$\Omega$ |
| R6 | 9.96 k$\Omega$ |
| C3 | 1 $\mu$F |
| C4 | 1 $\mu$F |
| C6 | 1 $\mu$F |
| C7 | 1 $\mu$F |

The ring generation circuit 340 receives ring out control line via the PC interface 320 to signal to the user when there is an incoming call. The ring generation circuit 340 contains a transformer coupled to the incoming tip line on one half of the circuit and a trigger circuit designated as U1 on the other half. One of the difficulties faced by the podule 300 is that a phone interface needs to be able to transmit a ring signal to the attached phone. This ring signal is about a 250V signal, far more than the 5V available via the PC interface 320. U1 is a component that provides the ring signal out of pin 3 whenever a control is sensed on pin 5. U1 can be a 555B timer enabled by its control input. Thus, the DSP controls the activation and cadence of the ring signal. The 5-volt peak to peak, 20 Hz ring signal output from U1 is then transformed into 40 volts peak to peak via the 8 to 1 ring signal transformer. Allowing the ring generation circuit 340 to convert an original control ring signal powered by 5V into a 200V signal. Exemplary enabling values for the individual components of the Ring Generation Circuit 340 are found in table 2 below, where the transformer has about an 8 to 1 turn ratio.

TABLE 2

FIG. 4 Components

| Component Designation | Value |
|---|---|
| The trigger circuit U1 | 555b circuit. |
| R13 | 70 kΩ |
| R14 | 1 kΩ |
| C9 | 1.0 µF |

The off-hook circuit 360 comprises a level switch and sensor that detects when the telephone handset is lifted from the telephone base station. The level switch and sensor can be created in many ways presently known and practiced in the art. One method of detection is depicted in FIG. 4, wherein the off-hook circuit comprises transistor Q3, a base resistor $R_B$, a switch activation resistor $R_A$, and a biasing resistor Rc. When a connection is made across the Tip and Ring lines, current will begin to flow through $R_A$, which turns on transistor Q3. When Q3 is turned on the off-hook output line is asserted low, indicating that the handset is off-hook. Upon the low-assertion of the off-hook line, the controller requests that the DSP generate a dial tone signal and send it to the handset across the tip and ring via the four analog signal lines from the interface 320. Appropriate digital files containing data for sound signal reproduction, such as voice, MP3, .WAV, or other digital sound files are translated into audio signals for transmission to the attached telephone. Other acceptable digital sound and video file types include: .WAV, .AVI, .MOV. .QT, .MP3, .DAT, .MPG, .MPA, .MPV, .ASF, .ASX, .IVF, .LSF, .LSX, .WAX, or .SV files. The sound signal reproduction and area codes are then supplied under the direction of the external DSP to the attached telephone. These signals simulate the central office telephone sounds or tones and are generated and sent to the telephone via the four analog signal lines, CODEC OUT+, CODEC IN+, CODEC OUT−, and CODEC IN−. The values of the Resistors $R_A$, $R_B$, and $R_C$ are dependent on the transistor size Q3, and should be set so as to activate the transistor when the phone is off-hook.

As can be appreciated by those skilled in the art, there are many acceptable alternative configurations for the off-hook circuit including circuits that indicate an on-hook state instead of an off-hook state or circuits that both detect and generate the feedback signals without using the DSP, thereby reducing the overhead burden on the DSP. One alternative configuration merges the low-pass gyrator circuit and DC loop generation circuit 350 with the on-hook circuit, by substituting R12 as $R_A$ in the on-hook circuit. In this configuration $R_B$ is attached to R12, C5, and R11 at connection point A. Q3 and $R_C$ would stay attached to the respective components as previously described and illustrated in FIG. 4.

Optionally included in the off-hook circuit is a signal database containing digital sound files, such as .WAV files, in the form of voice and error codes. The signal database is selectively located on the controller or DSP module, the host computer, the modem, or the podule. The signal database serves as a status and error code signaling device. For example, when a dialed DTMF digit doesn't match up, the database sends a .WAV file containing a prerecorded voice saying "dialed number does not match IP on file" or "Please hang up and try again." Another useful signal indicates whether the IP interface is active by pulsing or looping a .WAV file so the user can hear the dial tone.

Previously, a VoIP user was restricted to being near the computer, so a graphical error box was sufficient. But with the introduction of the short-range wireless VoIP connection the user may not be in the vicinity of the computer monitor, so an audible feedback signal is necessary to indicate the call status. The podule and modem combination must be able to track the progress of the call and send appropriate signals, such as .WAV files, as feedback to the handset speaker to let the user know how the call is progressing. For example, as the call initiator, the user expects to hear a dial tone. Or when a placed call doesn't go through, the user expects a signal or voice to inform the user that "The system is unable to place your call." One method of accomplishing this signaling is through looped .WAV files. For example, when placing a call a dial tone is simply the host PC sending out a looped .WAV file. After selecting a DTMF digit, host gets an interrupt, turns off the dial tone and handles the interrupt, essentially becoming a central office (CO). Dial tones or DTMF tones pass right through the podule to the CODEC allowing the modem to decode them. Voice signals will travel to and from the CODEC interface via the conversion module 330.

On handset terminated calls the process is reversed. First the call comes in across the communication network and the ring signal comes in from the modem, pulsing in the cadence of a ring signal to generate a ring from the ring generation circuit 340. Once the user takes the phone off-hook to answer that call, the on-hook latch is unasserted and the ring stops allowing voice signals to pass through the CODEC interface without interference. The call is terminated when an on-hook state is reasserted or detected by either party to the call.

The PC interface 320 depicted in FIG. 4 contains the following: a five volt pin, an on-hook pin, a ring out pin, a CODEC out+pin, a CODEC in+pin, a CODEC in−pin, a CODEC out−pin, and a ground wire. The PC interface 320 pins may be constructed in a GPIO format or other modem interface. The on-hook output pin and ring out pin are control lines with the attached DSP or controller, indicating to either the DSP whether an on-hook or ring-out signal should be generated. The PC interface 320 receives the four wire signal lines from the conversion module 330 as CODEC in and out lines. These CODEC interface lines are converted from the original tip and ring lines. Capacitor C1 is attached to the tip signal and the tip signal is split into two lines through the parallel connection of R1 and R6. These signals become CODEC OUT+and CODEC IN−on PC interface 320. The ring line passes through C2 and is divided through R2 and R5 into the CODEC IN+and the CODEC OUT−on PC interface 320. Following the voltage drop across R5, the CODEC N+line is attached to the CODEC OUT+line via R3. A similar attachment occurs after R6 from the CODEC IN−line to the CODEC OUT−line across R4. PC interface 320 is completely powered from the host computer or modem via the 5V pin and ground pin. This interface can easily be adapted to plug into existing 15 or 34 pin cellular interfaced products to retroactively function with a flash update for users.

As previously mentioned, the low pass gyrator circuit and DC loop generation module 350 supplies power to the telephones' DAA and functions in a manner similar to a modem hold circuit. The loop generation module 350 also generates the required loop current needed to generate 20 mA from a 5-volt source for the hold circuit. The components necessary for module 350 consist of a Q2N 2222, diode D2 and charge pump HB1. The exemplary values for these components are provided in table 3 below:

TABLE 3

FIG. 4 Components

| Component Designation | Value |
| --- | --- |
| R10 | 30 kΩ |
| R11 | 45 kΩ |
| R12 | 50 kΩ |
| C5 | 10 µF |
| Q1, Q2 | are part of a circuit called a Q2N 2222. |
| D2 | D05az 12 |
| HB1 | Max 1682/3 charge-pump |

Figure 5:
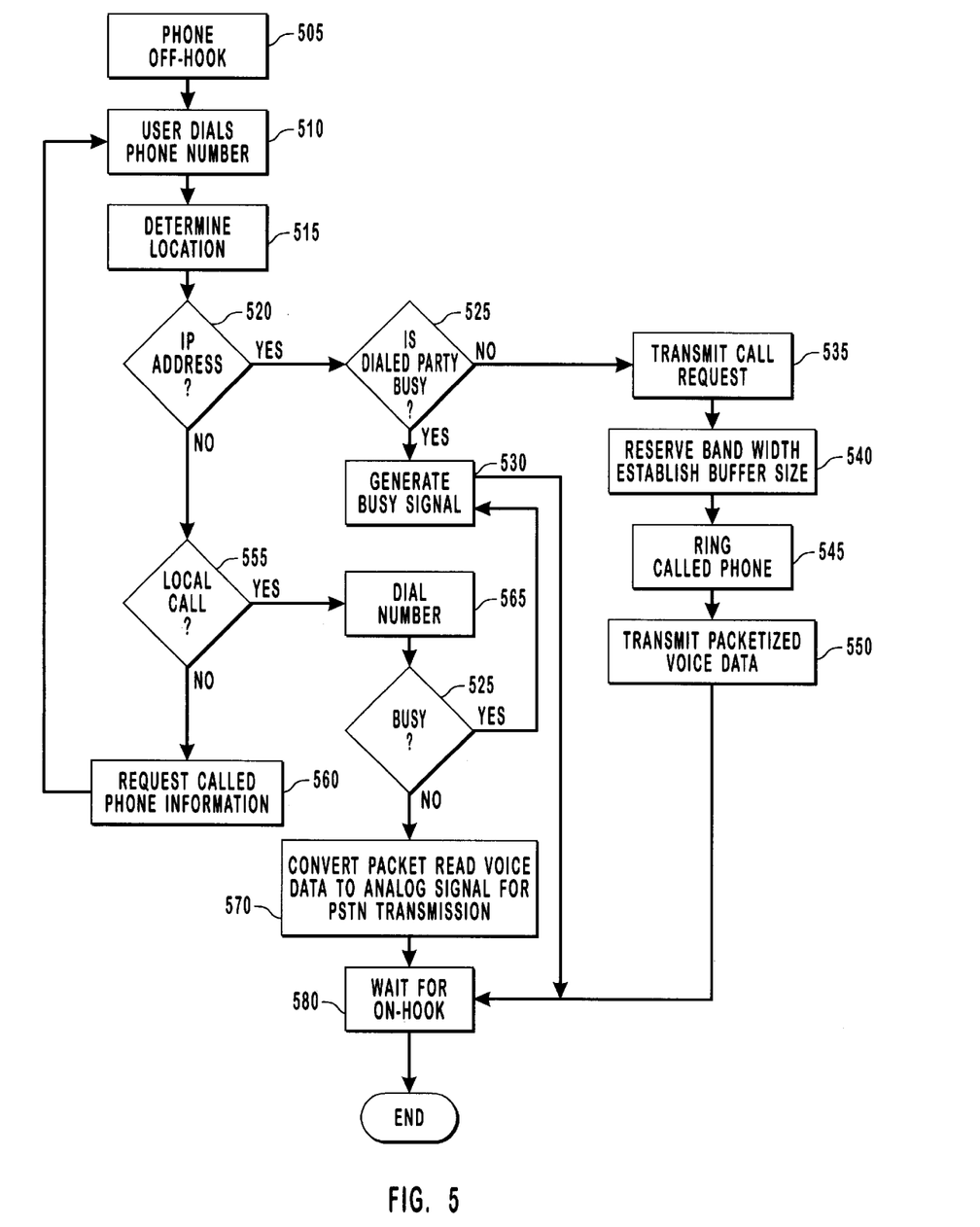
FIG. 5 is a flow chart of a VoIP call using the VoIP interface.

With reference to FIG. 5, a flow chart of one embodiment for placing a VoIP phone call. Execution block 505 detects off-hook status and initiates a request to generate a dial tone. Execution block 510 receives the DTMF tones from the DTMF keypad on the telephone and converts the tones into digital values. Once the digital values of the phone number are known, execution block 515 determines the location of the called party. This may be accomplished by referencing a look-up table containing the telephone numbers and contact information, such as IP or E-mail addresses. Other acceptable data recovery methods include linked pointer and linked chain databases, or any other data storage mechanism that allows a user to reference an electronic address with a reference number.

If an associated IP address is found, query block 520 is satisfied and query block 525 will determine whether the dialed party is busy. If the connection is busy then execution block 530 generates a busy signal moves to the end condition 590. If the called party is not busy then execution block 535 begins to transmit a call request. Following a successful call request, execution block 540 reserves bandwith and establishes VoIP buffers based on the connection type available and overall circuit performance. Execution block 545 sends out a ring signal to the called phone. Once the called phone has been answered, execution block 550 transmits packetized voice data. During the transmission stage this invention waits for the on-hook signal to be detected by execution block 570 and so that it can move to the end condition 590.

If query block 520 is not satisfied, then query block 555 determines whether the dialed call is a local call. If query block 555 is not satisfied, execution block 560 requests additional information concerning the called phone number and returns to execution block 510. If query block 555 is affirmative, then the invention will generate DTMF dial tones similar to the previously dialed phone number along with any necessary exchange instructions in execution block 565. Following dial 565 the invention revisits Busy signal query 525. As before, if a busy signal is detected in query block 525 then execution block 530 generates a busy signal for the handset. A looping digital sound file, such as a .WAV file, or an appropriately pulsing analog signal generates this busy signal until an on-hook state is detected in execution block 580 and the VoIP call is terminated. If no busy signal is detected following the DTMF dial of the local call, then the network CODEC in execution block 570 converts the packetized voice data back into an analog signal for PSTN transmission. The invention allows the data stream to continue until an on-hook signal is detected and then execution block 580 moves to the end condition. There are many arrangements that satisfy the VoIP call requirements and the described flow chart embodiment is to be considered in all respects only as illustrative and not restrictive.

Figure 6:
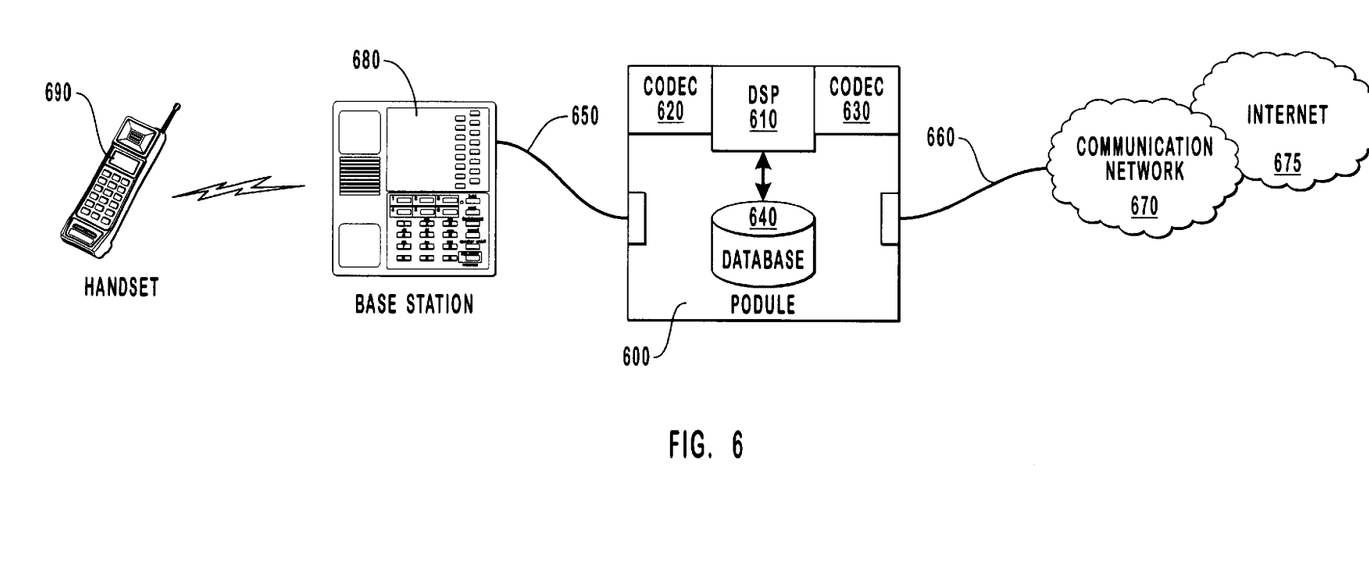
FIG. 6 is a computerless exemplary system that provides a podule interface between a short-range wireless telephone and a communication network.

With reference to FIG. 6, an exemplary system that provides a podule interface between a short-range wireless telephone and a communication network, without requiring the services of a general-purpose computer. With the development of an efficient dual CODEC DSP modem, the standard modem configuration may be slightly altered to create an independent podule 600 comprising DSP 610, telephone CODEC 620, network CODEC 630, and database 640.

As previously mentioned, a suitable class of DSP processors includes the TI C54 DSP core and associated DSP SRAM cache and buffers, or any other DSP processor or combination of DSP processors capable of simultaneous communication with the telephone CODEC 620 and network CODEC 630. Database 640 contains look-up tables for telephone numbers and IP address and may also store necessary software applications.

The CODEC devices perform analog-to-digital and digital-to-analog conversion and compression of audio signals. Network CODEC 630 interfaces with network communication line 660 via communication interfaces on podule 600. Network CODEC 630 is responsible for sending out packetized data across communication line 660 to communication network 670. While many Internet voice phone connections possess too much jitter for normal conversations, the present invention drastically reduces the latency and processor overhead corresponding to these signals. These improvements make packetized communication across more congested communication networks, such as Internet 675 possible.

Telephone CODEC 620 interfaces with tip and ring lines 650 via the podule 600 telephone interface. While the tip and ring lines 650 can attach to any standard telephone, the preferred method couples with a short-range wireless telephone, which has a base station 680 and a handset 690. One variation of the present invention integrates podule 600 into base station 680, thereby creating a stand-alone VoIP cordless telephone. FIG. 6 effectively illustrates the low overhead of the dual CODEC design disclosed in FIGS. 1–4 upon the resources of an attached computer, by demonstrating the virtually elimination of outside control, processing, and buffering.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States letters patent is:

1. A Voice over Internet Protocol (VoIP) interface between a standard telephone and a packetized dial-up network, comprising:

a podule for generating POTS responses, the podule being electrically connected to the telephone via tip and ring lines, wherein analog voice signals are typically picked up by the telephone microphone and transmitted via the tip and ring lines to the podule; and a modem operably connected to the podule via a detachable interface, the modem including:

a telephone CODEC electrically connected to the podule, the telephone CODEC performing analogto-digital and digital-to-analog conversion and compression of audio signals transmitted with the telephone;

a network CODEC electrically connected to the dial-up network, the dial-up network CODEC performing analog-to-digital and digital-to-analog conversion and compression of audio signals transmitted with the dial-up network;

a Digital Signal Processor (DSP) electrically connected to the telephone CODEC and the network CODEC, the DSP facilitating simultaneous communication with the telephone CODEC and the network CODEC, the DSP sending control signals via the telephone CODEC to the podule to initiate POTS response generation; and wherein the modem is operably connected to a host computing device.

2. The VoIP interface as recited in claim 1, further comprising a signal database containing sound files representing various telephone signals, the telephone signals including a busy signal, a dial tone, a ringing signal, an off-hook warning signal, error signals, and various other audio and voice messages that relay information concerning the status of attempted VoIP calls to the user.

3. The VoIP interface as recited in claim 2, wherein the sound files in the signal database are looped WAV files.

4. The VoIP interface as recited in claim 1, wherein the standard telephone comprises a short-range wireless telephone handset and a base station; and wherein the network connection has a bandwidth greater than 10 kbps.

5. The VoIP interface as recited in claim 1, wherein the VoIP interface has a bandwidth from about 2.9 Kbps to about 13 Kbps.

6. The VoIP interface as recited in claim 1, further comprising a computer electrically coupled with the DSP via a modem interface, the computer including a call database with DTMF digits and IP addresses for various user selected VoIP contacts.

7. The VoIP interface as recited in claim 6, wherein the call database is a look-up table containing at least two of DTMF reference number, IP address, email address, telephone number, VoIP protocol specification, and related contact information.

8. The VoIP interface as recited in claim 1, wherein the podule generates the necessary hold circuit current and ring voltage upon input from the DSP via the interface between the telephone CODEC and the podule.

9. A method for using a standard telephone to communicate on a packetized dial-up data network, comprising the following steps:

creating a database, having at least a first field for telephone numbers and a second field for IP addresses;

dialing a desired telephone number;

referencing the database for the desired IP address according to the dialed telephone number;

initiating a packetized dial-up data communication session with referenced IP address;

determining an optical buffer and control size based in part on the quality and speed of the packetized data communication session connection;

converting received analog signals from a telephone microphone into packetized data;

transmitting packetized data;

receiving packetized data from referenced IP address including packetized voice data;

converting the packetized voice data into analog voice signal for transmission over telephone speaker; and terminating the packetized dial-up data communication session when on-hook status is detected.

10. The method as recited in claim 9, wherein the step of dialing a desired telephone number includes receiving DTMF digits dialed by a user on the standard telephone.

11. The method as recited in claim 10, further comprising the step of converting DTMF digits into digital values.

12. The method for using a standard telephone as recited in claim 9, further comprising the following step:

generating telephone signals for transmission over the standard telephone speaker, wherein the telephone signals indicate communication line status to the user.

13. The method for using a standard telephone as recited in claim 12, wherein the telephone signals include at least one of dial tone signals, busy signals, ringing signals, off-hook warning signals, and various voice messages to indicate communication line status to the user.

14. The method for using a standard telephone as recited in claim 9, further comprising the following step:

adding artificial noise to the recreated analog signal from the received packetized data so as to better emulate a standard telephone session.

15. The method as recited in claim 9, wherein the standard telephone comprises a short-range wireless handset and a wireless compatible base station, wherein the handset need not be in the same general vicinity as the telephone base station.

16. The method as recited in claim 9, wherein the step of referencing the database for the desired IP address further comprises the step of determining whether a standard PSTN connection or Voice-Over IP connection should be utilized.

17. The method as recited in claim 9, wherein the step of referencing the database for the desired IP address further comprises the step of determining whether the DTMF digits signify a long distance or local phone call.

18. A method for using a standard telephone to communicate on a packetized dial-up data network, comprising the following steps:

creating a database, having at least a first field for telephone numbers and a second field for IP addresses;

dialing a desired telephone number;

referencing the database for the desired IP address according to the dialed telephone number and determining whether DTMF digits signify a long distance or local phone call;

initiating a packetized dial-up data communication session with the referenced IP address;

converting received analog signals from a telephone microphone into packetized data;

transmitting packetized data;

receiving packetized data from the referenced IP address including packetized voice data;

converting the packetized voice data into analog voice signal for transmission over a telephone speaker; and terminating the packetized dial-up data communication session when on-hook status is detected.

* * * * *